United States Patent
Lin

(10) Patent No.: US 8,098,832 B2
(45) Date of Patent: Jan. 17, 2012

(54) APPARATUS AND METHOD FOR DETECTING SOUND

(75) Inventor: Che-Ming Lin, Taiwan (CN)

(73) Assignee: Panasonic Corporation, Osaka (JP)

( * ) Notice: Subject to any disclaimer, the term of this patent is extended or adjusted under 35 U.S.C. 154(b) by 553 days.

(21) Appl. No.: 12/376,637

(22) PCT Filed: Nov. 15, 2007

(86) PCT No.: PCT/JP2007/072604
§ 371 (c)(1),
(2), (4) Date: Feb. 6, 2009

(87) PCT Pub. No.: WO2008/062854
PCT Pub. Date: May 29, 2008

(65) Prior Publication Data
US 2010/0290632 A1    Nov. 18, 2010

(30) Foreign Application Priority Data
Nov. 20, 2006   (CN) .......................... 2006 1 0160414

(51) Int. Cl.
*H04R 29/00*    (2006.01)
(52) U.S. Cl. ............................................ 381/56; 381/92
(58) Field of Classification Search .................... 381/313
See application file for complete search history.

(56) References Cited

U.S. PATENT DOCUMENTS

| | | |
|---|---|---|
| 5,831,936 A | 11/1998 | Zlotnick et al. |
| 5,867,581 A * | 2/1999 | Obara ........................... 381/312 |
| 6,782,106 B1 | 8/2004 | Kong et al. |
| 6,987,856 B1 * | 1/2006 | Feng et al. ....................... 381/92 |
| 2004/0179694 A1 | 9/2004 | Alley |
| 2006/0115103 A1 | 6/2006 | Feng et al. |
| 2007/0127753 A1 | 6/2007 | Feng et al. |
| 2010/0290636 A1 * | 11/2010 | Mao et al. ........................ 381/74 |
| 2010/0302033 A1 * | 12/2010 | Devenyi et al. ............... 340/540 |

FOREIGN PATENT DOCUMENTS

| | | |
|---|---|---|
| WO | 2004/093487 | 10/2004 |
| WO | 2006/052023 | 5/2006 |

* cited by examiner

*Primary Examiner* — Benjamin Sandvik
(74) *Attorney, Agent, or Firm* — Greenblum & Bernstein, P.L.C.

(57) ABSTRACT

An apparatus for detecting sound includes a plurality of microphones, a sound inspecting unit, a direction estimating unit, a background noise removing unit, and an alerting unit. The microphones are used to collect sounds around a user. The sound inspecting unit is used to calculate the feature values of a background noise within a preset time interval, and to determine if a latest collected sound satisfies a preset condition. When the preset condition is satisfied, the direction estimating unit is used to estimate the occurrence direction of the latest collected sound, and to determine if the occurrence direction is within a preset range behind the user. When the preset range is satisfied, the background noise removing unit is used to remove the background noise in the latest collected sound so as to obtain a detected sound. The alerting unit is used to inform the user of the detected sound via an alert message. A method for detecting sound is also disclosed.

22 Claims, 5 Drawing Sheets

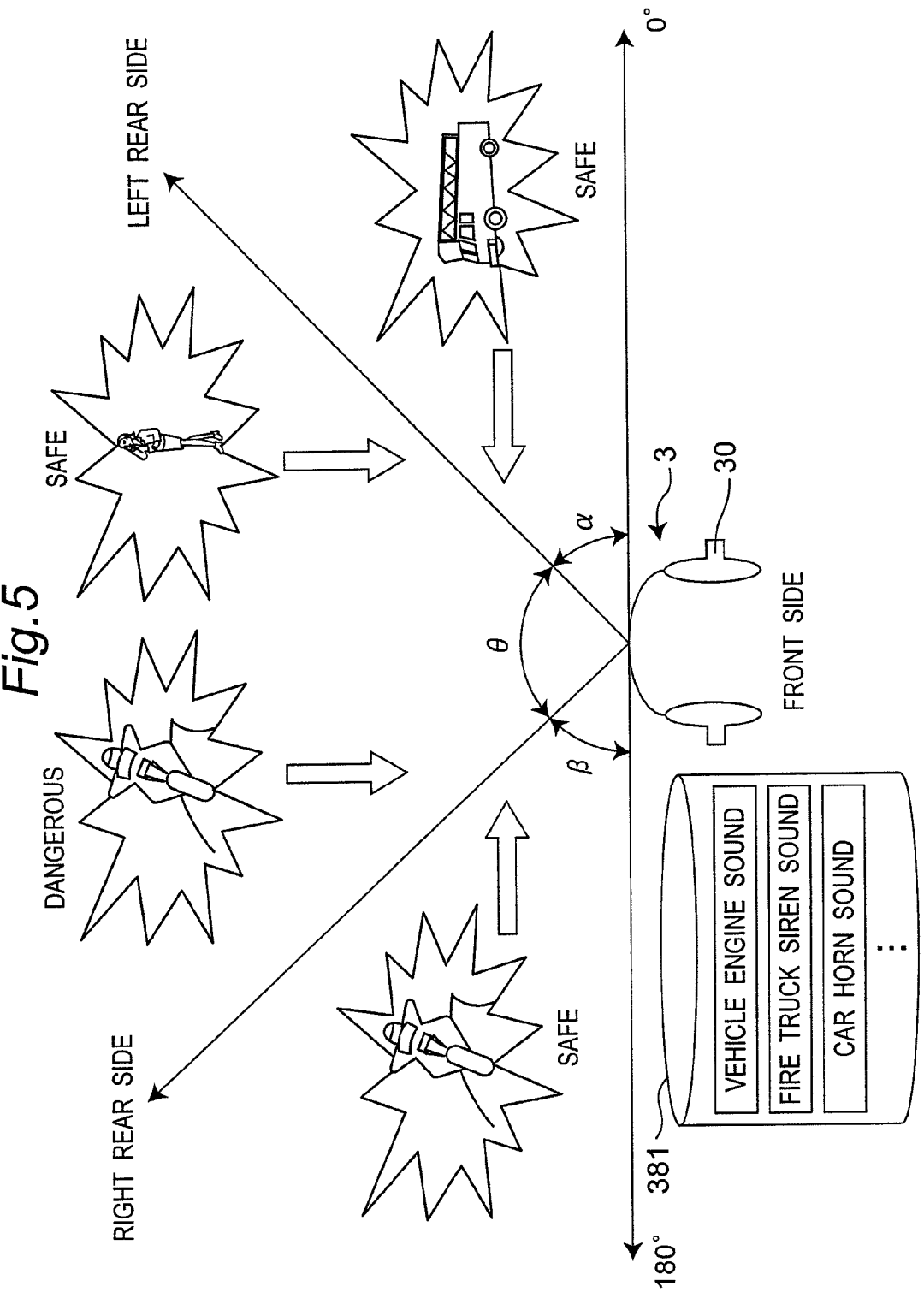

APPARATUS AND METHOD FOR DETECTING SOUND

TECHNICAL FIELD

The invention relates to an apparatus and method for detecting sound, and more particularly to an apparatus and method for detecting sound coming from behind a user.

BACKGROUND ART

FIG. 1 illustrates a sound transmitting apparatus 14 disclosed in U.S. Pat. No. 6,782,106 B1. The sound transmitting apparatus 14 includes an external sound receiver 20 (such as a microphone), a volume controller 22, and a mixer 28. The external sound receiver 20 is for receiving an external sound (ambient sound). The volume controller 22 is for controlling an input sound when necessary. The mixer 28 is for mixing a reproduced sound signal from a sound producing device and an external sound signal from the volume controller 22 to provide an output. The volume controller 22 only outputs the reproduced and external sound signals whose volumes exceed a predetermined value. In other words, external or reproduced sounds whose volumes are small will not be transmitted to a user.

When a pedestrian walks on a street, the pedestrian can listen to music using a music player having the sound transmitting apparatus 14 of U.S. Pat. No. 6,782,106 B1. Therefore, the music player can be used to alert the pedestrian whenever any loud sound occurs on the street.

However, a loud sound is not necessarily a sound that represents danger and that should be noticed by a pedestrian. When a pedestrian can realize the type and direction of a loud sound through other ways (such as by sight), the pedestrian does not have to rely on his or her hearing to respond to the loud sound.

That is to say, when a pedestrian wears earphones on both ears listening to music, the pedestrian can rely on his or her sight to notice an abnormal sound or a sound representing an emergency situation that comes from the front, and does not need to use the sound transmitting apparatus 14 of U.S. Pat. No. 6,782,106 B1 to output the sound coming from the front as a notification to the pedestrian. However, it is necessary to output abnormal sounds or sounds representing emergency situations that come from behind the pedestrian through the earphones so as to notify the pedestrian. Therefore, there is a need to find a solution such that a pedestrian who is wearing earphones to listen to music does not hear sounds coming from the front but is still able to hear abnormal sounds coming from behind through the earphones.

DISCLOSURE OF INVENTION

Therefore, an object of the present invention is to provide an apparatus for detecting sound that can be used to enable a user to hear through the apparatus of this invention only sounds coming from behind and not sounds coming from the front, so as to enhance the safety of the user who is walking on a street, which may otherwise cause unnecessary disturbance to music being listened to by the user.

Accordingly, the apparatus for detecting sound of the present invention is adapted to be worn on both ears of a user so as to detect sounds from behind the user, wherein the sounds include a background noise. The apparatus includes a plurality of microphones, a sound inspecting unit, a direction estimating unit, a background noise removing unit, and an alerting unit. The microphones are used to collect sounds around the user. The sound inspecting unit is used to calculate the feature values of the background noise within a preset time interval, and to determine if a latest collected sound satisfies a preset condition. When the preset condition is satisfied, the direction estimating unit is used to estimate the occurrence direction of the latest collected sound, and to determine if the occurrence direction is within a preset range behind the user. When the occurrence direction is within the preset range, the background noise removing unit is used to remove the background noise in the latest collected sound so as to obtain a detected sound. The alerting unit is used to inform the user of the detected sound via an alert message.

Another object of the present invention is to provide a method for detecting sound that can be used to enable a user to hear through the apparatus of this invention only sounds coming from behind and not sounds coming from the front, so as to enhance the safety of the user who is walking on a street, which may otherwise cause unnecessary disturbance to music being listened to by the user.

Accordingly, the method for detecting sound of the present invention includes the following steps. First, sounds around a user are collected, wherein the sounds include a background noise. Then, the feature values of the background noise within a preset time interval are calculated, and it is determined if a latest collected sound satisfies a preset condition. Next, when the preset condition is satisfied, the occurrence direction of the latest collected sound is estimated to determine if the occurrence direction is within a preset range behind the user. Subsequently, when the occurrence direction is within the preset range, the background noise in the latest collected sound is removed so as to obtain a detected sound. Thereafter, the user is informed of the detected sound via an alert message.

BRIEF DESCRIPTION OF DRAWINGS

Other features and advantages of the present invention will become apparent in the following detailed description of the preferred embodiment with reference to the accompanying drawings, of which:

FIG. 5 is a schematic diagram illustrating "safe" and "dangerous" situations of sounds detected by the preferred embodiment.

BEST MODE FOR CARRYING OUT THE INVENTION

Figure 1:
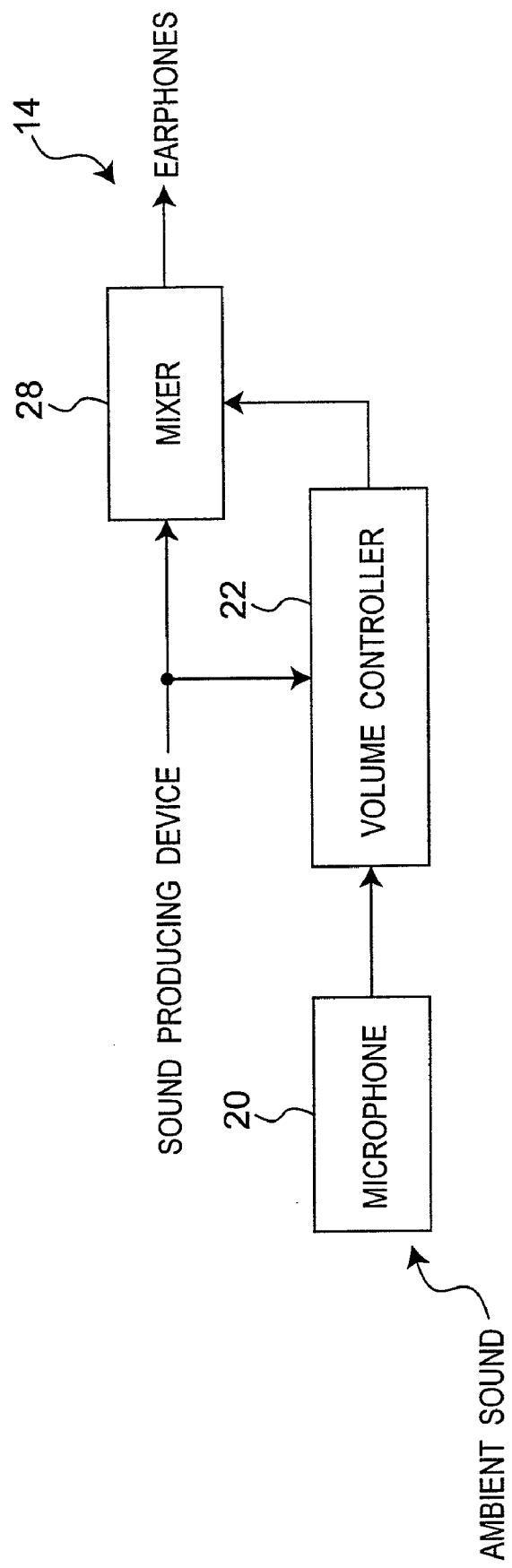
FIG. 1 is a block diagram illustrating a conventional sound transmitting apparatus.
Figure 2:
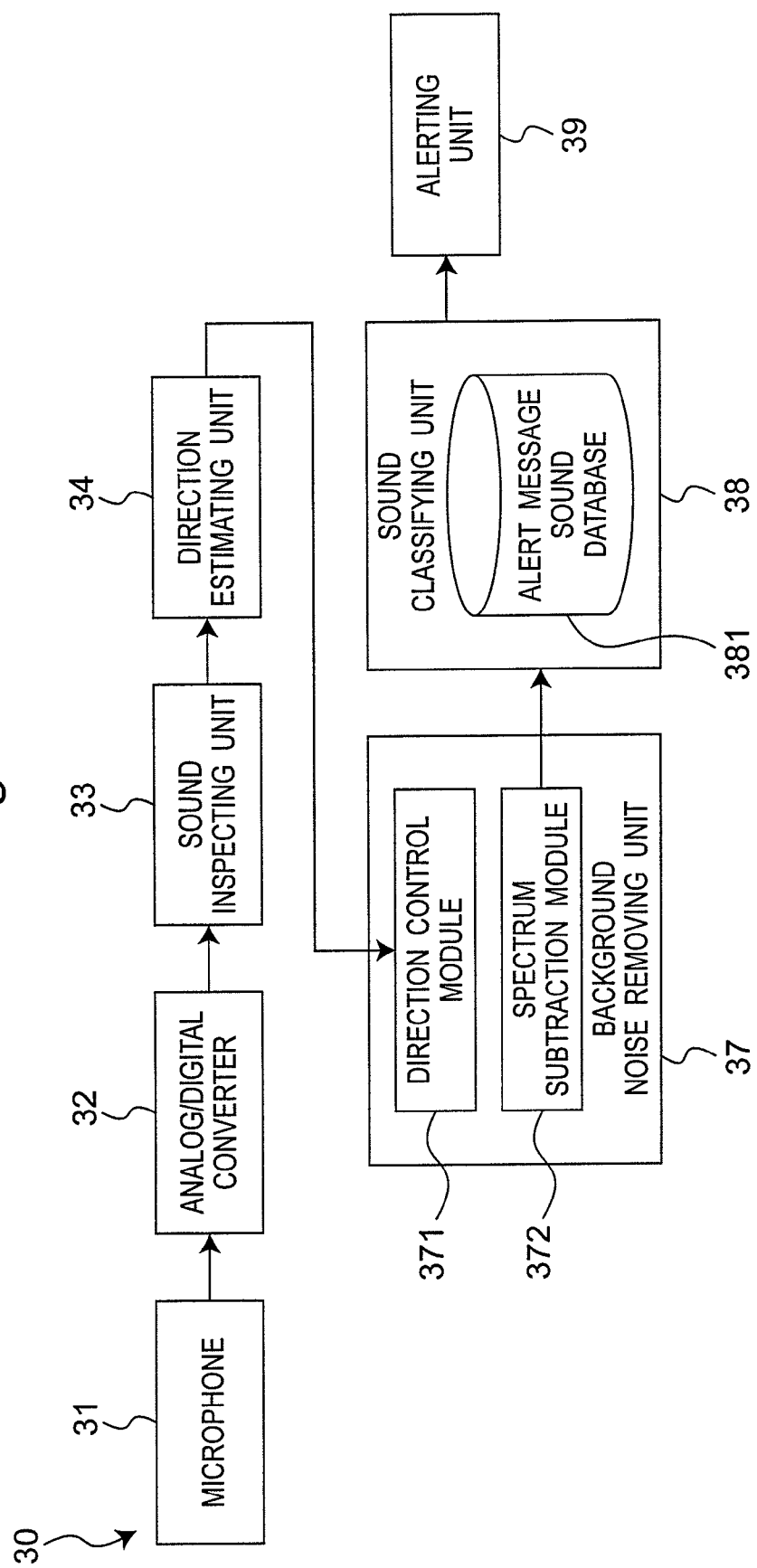
FIG. 2 is a block diagram illustrating a preferred embodiment of an apparatus for detecting sound according to the present invention.
Figure 4:
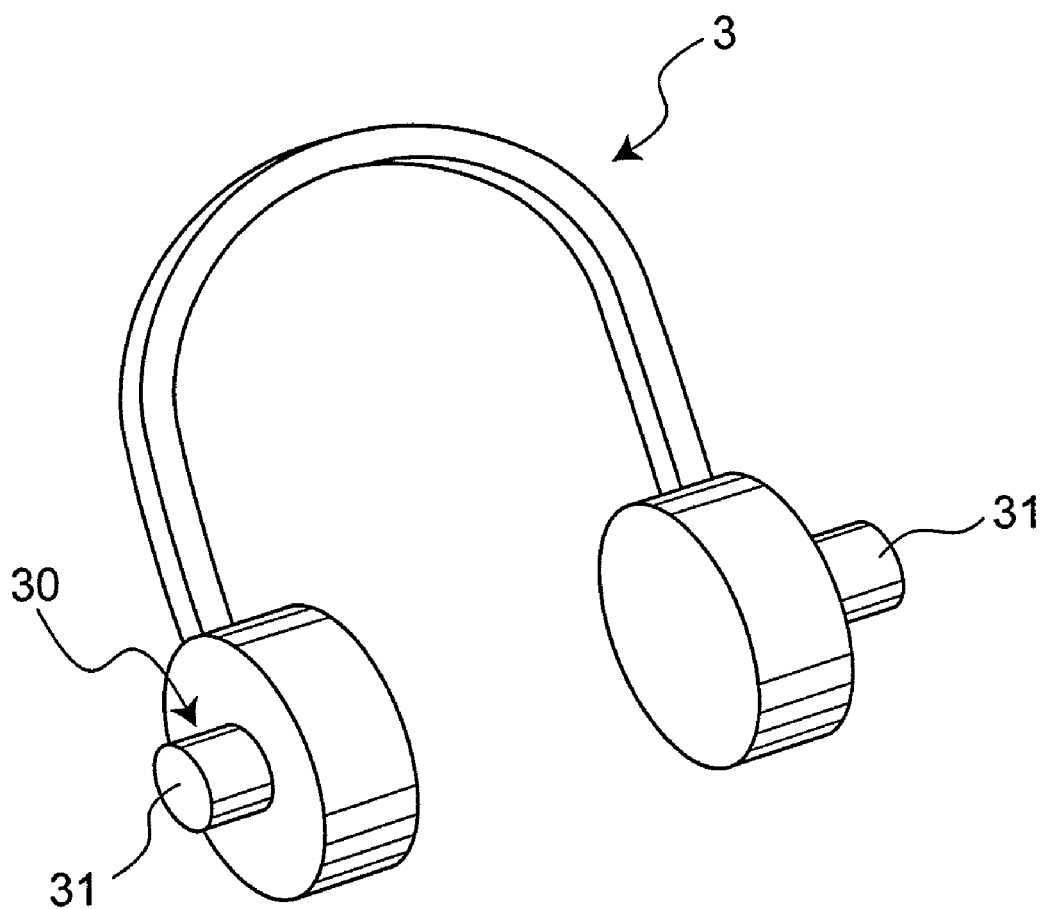
FIG. 4 is a schematic diagram illustrating the apparatus for detecting sound of the present invention when installed on stereophonic earphones.

Referring to FIGS. 2 and 4, a preferred embodiment of an apparatus 30 for detecting sound according to the present invention is adapted to be worn on both ears of a user. As an example, the apparatus 30 of the present invention can be installed as a part of stereophonic earphones 3. When a user, who wears the stereophonic earphones 3 containing the apparatus 30 to listen to sounds such as music, is walking on a street, the apparatus 30 can be used to detect sounds coming from behind the user, wherein the sounds can be siren sounds of a police car, an ambulance or a fire truck, sounds of a car horn, engine sounds of a vehicle, etc.

Referring to FIG. 2, the apparatus 30 includes a plurality of microphones 31, an analog/digital converter 32, a sound inspecting unit 33, a direction estimating unit 34, a background noise removing unit 37, a sound classifying unit 38, and an alerting unit 39.

Referring to FIG. 4, in the preferred embodiment, the number of the microphones 31 is two, and the microphones 31 are installed on the two sides of the main body of the stereophonic earphones 3, respectively. However, the present invention is not limited in this aspect. In other embodiments, as long as the distance between the two microphones 31 is far enough for detecting the direction of sound, the two microphones 31 can be installed on the same side of the main body of the stereophonic earphones 3 while still enabling the apparatus 30 to perform the function of sound detection.

Referring to FIG. 2, the microphones 31 are used to collect sounds around the user. Aside from various sounds that can occur around the user, the sounds further include a background noise. The analog/digital converter 32 is for converting the analog signals of the sounds collected by the microphones 31 into their digital signals.

The sound inspecting unit 33 is for calculating the feature values of the background noise within a preset time interval, and to determine if a latest collected sound satisfies a preset condition. In the preferred embodiment, the sound inspecting unit 33 calculates an average value and a standard deviation of the energy spectrum of the background noise within the preset time interval as the feature values. The preset time interval can be 20 frames=20×0.064 second/frame=1.28 seconds. That is to say, for every preset time interval, the sound inspecting unit 33 will update the average value and standard deviation of the energy spectrum of the background noise. In addition, the preset condition can be that the energy of the latest collected sound is larger than the sum of the average value and the standard deviation. When the preset condition is satisfied, this indicates that the latest collected sound may possibly include sounds that represent danger, such as siren sounds of a police car, an ambulance or a fire truck, sounds of a car horn, engine sounds of a vehicle, etc.

Referring to FIGS. 2 and 5, when the preset condition is satisfied, the direction estimating unit 34 is used to estimate the occurrence direction of the latest collected sound, and to determine if the occurrence direction is within a preset range θ behind the user. In the preferred embodiment, the direction estimating unit 34 uses a Direction of Arrival (DOA) technique to estimate the occurrence direction of the latest collected sound that satisfies the preset condition, where the Direction of Arrival technique can be the Multiple Signal Classification (MUSIC) method. In addition, in the preferred embodiment, the user's left ear is set as 0 degree, the user's right ear is set as 180 degrees, and the preset range θ is larger than or equal to 30 degrees and smaller than or equal to 150 degrees. When it is determined that the occurrence direction of the latest collected sound is within the preset range θ behind the user, the direction estimating unit 34 will send the latest collected sound to the background noise removing unit 37.

The background noise removing unit 37 includes a direction control module 371 and a spectrum subtraction module 372. When the preset range θ is satisfied, the background noise removing unit 37 is used to remove the background noise in the latest collected sound so as to obtain a detected sound. The direction control module 371 is used to remove the background noise which is not within the preset range θ from the latest collected sound that satisfies the preset condition. In the preferred embodiment, the direction control module 371 adjusts a weight vector of the direction control of a spatial filter to remove the background noise which is not within the preset range θ from the latest collected sound that satisfies the preset condition. The spectrum subtraction module 372 is used to remove the background noise which is within the preset range θ from the latest collected sound that satisfies the preset condition. In the preferred embodiment, the spectrum subtraction module 372 obtains the detected sound by first calculating the energy spectrum in the preset range θ from the latest collected sound that satisfies the preset condition, and then subtracting the average energy spectrum of the background noise from the energy spectrum calculated above.

The sound classifying unit 38 is for receiving the detected sound sent by the background noise removing unit 37, and includes an alert message sound database 381. The alert message sound database 381 includes sound samples of various alert sounds, such as vehicle engine sounds, fire truck sirens, car horn sounds, etc. In addition, the sound classifying unit 38 can be further used to identify from the alert message sound database 381 an alert message corresponding to the detected sound, and to transmit the alert message to the alerting unit 39. Therefore, when a user, who is wearing the stereophonic earphones 3 equipped with the apparatus 30 to listen to sounds such as music, is walking on a street, the alerting unit 39 (such as speakers of the stereophonic earphones 3) can output the alert message to the user, so as to remind the user of necessary attention to a situation that occurs from behind.

Referring to FIGS. 2 to 5, the preferred embodiment of a method for detecting sound according to the present invention includes the following steps. First, in step 50, the microphones 31 are used to collect sounds around the user. Then, in step 51, the analog/digital converter 32 is used to convert the analog signals of the collected sounds into their digital signals.

Next, in step 52, the sound inspecting unit 33 is used to calculate the feature values of the background noise within the preset time interval. In the preferred embodiment, an average value and a standard deviation of the energy spectrum of the background noise within the preset time interval are calculated in step 52 as the feature values.

Thereafter, in step 53, the sound inspecting unit 33 determines if a latest collected sound satisfies the preset condition. As mentioned hereinabove, in the preferred embodiment, the preset condition can be that the energy of the latest collected sound is larger than the sum of the average value and the standard deviation. If the determination result in step 53 is yes, the flow will proceed to step 54. On the other hand, if the determination result in step 53 is no, further processing of the latest collected sound will not be performed, and the microphones 31 continue to collect sounds around the user.

In step 54, when the determination result in step 53 is yes, which indicates that the latest collected sound includes large energy sounds, the direction estimating unit 34 estimates the occurrence direction of the latest collected sound. As mentioned hereinabove, step 54 can be performed using the MUSIC method in the Direction of Arrival techniques.

Next, in step 55, the direction estimating unit 34 continues to determine if the occurrence direction is within the preset range θ behind the user. As described hereinabove with reference to FIG. 5, in the preferred embodiment, the preset range θ can be a range behind the user that is larger than or equal to 30 degrees and smaller than or equal to 150 degrees. If the determination result in step 55 is yes, the flow continues to step 56.

On the other hand, if the determination result in step 55 is no, this indicates that the latest collected sound occurs outside the preset range θ. That is to say, it is possible that the latest collected sound occurs in front of the user or within a range α or β behind the user, all of which indicates that the latest collected sound occurs within a safety region. Therefore, regardless of whether the latest collected sound is a sound that represents safety or danger, the method and apparatus of the present invention will not continue to process such collected sound, that is, they will not output an alert message to inform the user of the latest collected sound that represents danger and that occurs within the safety region. For example, in FIG. 5, although the siren sound of a fire truck occurs within the range α behind the user, since the range α is considered to be a safety region, there is no need to output an alert message to inform the user of the siren sound of the fire truck within the range α. Likewise, although the engine sound of a vehicle occurs within the range β behind the user, since the range β is also considered to be a safety region, there is no need to output an alert message to inform the user of the engine sound of the vehicle within the range β.

In step 56, when the latest collected sound occurs within the preset range θ behind the user, the background noise removing unit 37 will remove the background noise therein to obtain the detected sound. As mentioned hereinabove, the background noise which is not within the preset range θ is first removed from the latest collected sound that satisfies the preset condition in step 56, followed by the removal of the background noise which is within the preset range θ from the latest collected sound that satisfies the preset condition. In the preferred embodiment, the direction control module 371 of the background noise removing unit 37 is used to adjust the weight vector of the direction control of the spatial filter to remove the background noise which is not within the preset range θ from the latest collected sound that satisfies the preset condition. The spectrum subtraction module 372 is then used to first calculate the energy spectrum in the preset range θ from the latest collected sound that satisfies the preset condition, and then to subtract the average value of the energy spectrum of the background noise from the energy spectrum calculated above so as to obtain the detected sound.

Thereafter, in step 57, the sound classifying unit 38 is used to perform sound recognition tasks. In the preferred embodiment, the sound classifying unit 38 first calculates a Mel-Frequency Cepstral Coefficient (MFCC) of the detected sound. Then, according to the MFCC, the sound classifying unit 38 calculates the Mahalanobis distances between the detected sound and the sound samples of the various alert sounds in the alert message sound database 381. Next, the sound classifying unit 38 identifies the type of the detected sound by selecting the sound sample of the alert sound message with the smallest Mahalanobis distance, and sends the alert message to the alerting unit 39.

Subsequently, in step 58, the alerting unit 39 outputs the alert message to inform the user. Therefore, when the user, who is wearing the stereophonic earphones 3 to listen to sounds such as music, is walking on a street, the method for detecting sound of the present invention can be used to output the alert message to the user so as to remind the user of necessary attention to a situation that occurs from behind.

Figure 3:
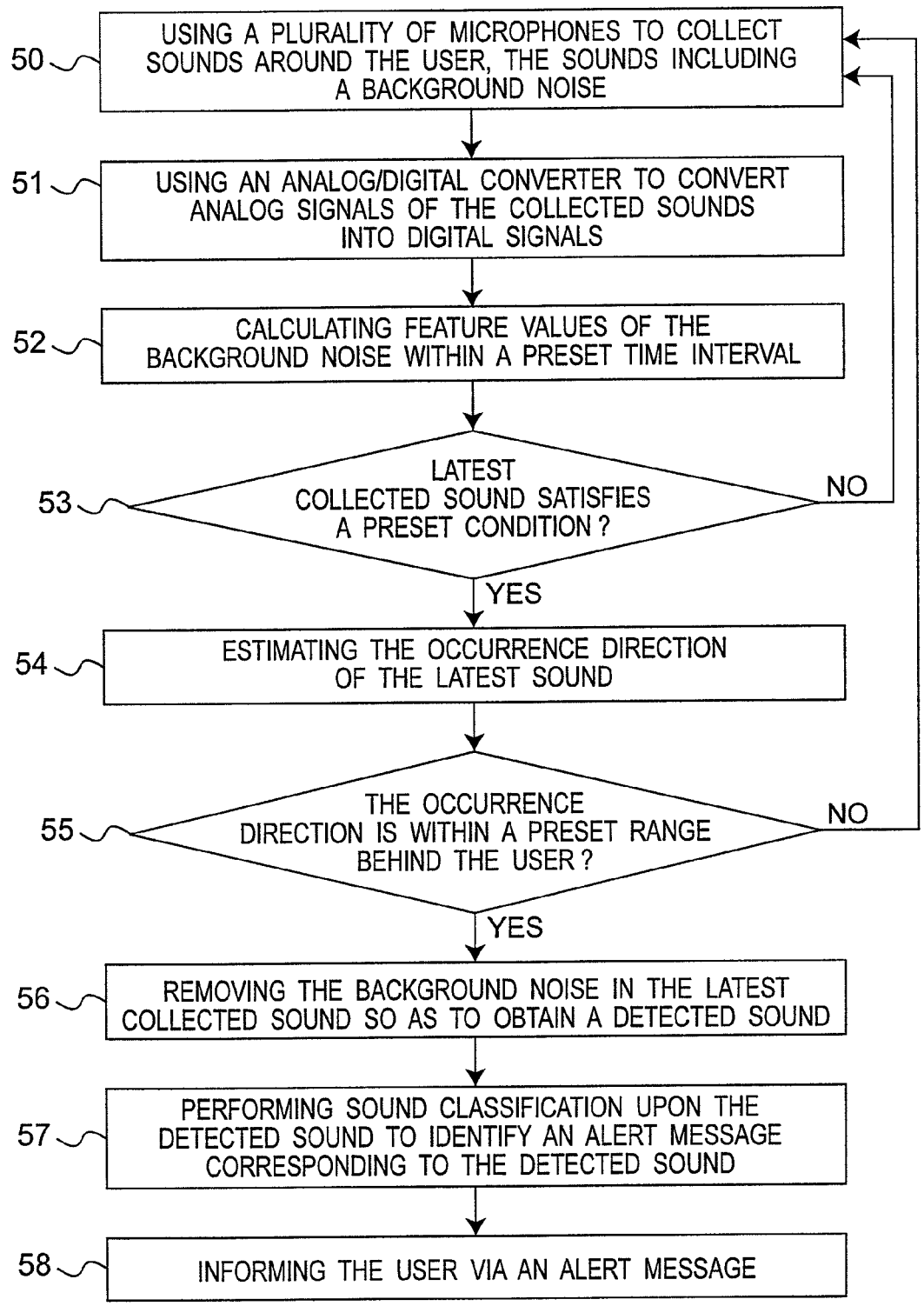
FIG. 3 is a flowchart to illustrate a preferred embodiment of a method for detecting sound according to the present invention.

Referring to FIG. 5, when a vehicle that was originally in the range β (safety region) moves into the preset range θ, the present invention will perform steps 56 to 58 of FIG. 3 upon detecting the engine sound of the vehicle. Since the vehicle's engine sound will be identified by the sound classifying unit 38 as complying with the "vehicle engine sound" sample in the alert message sound database 381, the alerting unit 39 will output the alert message corresponding to the vehicle engine sound to inform the user. As an example, the speakers of the stereophonic earphones 3 will output an alert message, e.g., "vehicle on the right rear side". However, if there is a pedestrian talking on a cell phone within the preset range θ, since there is no "cell phone talking sound" sample in the alert message sound database 381 (indicating that "cell phone talking sound" is not a sound that represents danger), even though the cell phone talking sound occurs within the preset range θ, the alerting unit 39 of the present invention will not output an alert message corresponding to the cell phone talking sound to the user.

In sum, when a pedestrian is wearing the apparatus of the present invention on both ears to listen to sounds such as music, the apparatus and method for detecting sound of the present invention can be used so that the pedestrian is able to hear through the apparatus of this invention only sounds coming from behind but not sounds coming from the front so as to enhance the safety of the pedestrian who is walking on a street, which may otherwise cause unnecessary disturbance to music being listened to by the pedestrian.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

INDUSTRIAL APPLICABILITY

The present invention can be applied to an apparatus for detecting sound and to a method therefor.

The invention claimed is:

1. An apparatus for detecting sound adapted to be worn on both ears of a user so as to detect sounds from behind the user, wherein the sounds include a background noise, said apparatus comprising:
   a plurality of microphones for collecting sounds around the user;
   a sound inspecting unit for calculating the feature values of the background noise within a preset time interval and for determining if a latest collected sound satisfies a preset condition;
   a direction estimating unit for estimating the occurrence direction of the latest collected sound and for determining if the occurrence direction is within a preset range behind the user, when the preset condition is satisfied;
   a background noise removing unit for removing the background noise in the latest collected sound so as to obtain a detected sound, when the occurrence direction is within the preset range; and
   an alerting unit for informing the user of the detected sound via an alert message.

2. The apparatus for detecting sound as claimed in claim 1, wherein said sound inspecting unit calculates an average value and a standard deviation of the energy spectrum of the background noise within the preset time interval as the feature values, and the preset condition be that the energy of the latest collected sound is larger than the sum of the average value and the standard deviation.

3. The apparatus for detecting sound as claimed in claim 2, wherein said background noise removing unit includes a direction control module and a spectrum subtraction module, said direction control module being used to remove the background noise which is not within the preset range from the latest collected sound that satisfies the preset condition, said spectrum subtraction module being used to remove the background noise which is within the preset range from the latest collected sound that satisfies the preset condition.

4. The apparatus for detecting sound as claimed in claim 3, wherein said direction control module removes the background noise which is not within the preset range from the latest collected sound that satisfies the preset condition by adjusting a weight vector of the direction control of a spatial filter.

5. The apparatus for detecting sound as claimed in claim 3, wherein said spectrum subtraction module first calculates the energy spectrum in the preset range from the latest collected sound that satisfies the preset condition, and then subtracts the average value of the energy spectrum of the background noise from the calculated energy spectrum so as to remove the background noise which is within the preset range from the latest collected sound that satisfies the preset condition, thereby obtaining the detected sound.

6. The apparatus for detecting sound as claimed in claim 1, wherein said background noise removing unit includes a direction control module and a spectrum subtraction module, said direction control module being used to remove the background noise which is not within the preset range from the latest collected sound that satisfies the preset condition, said spectrum subtraction module being used to remove the background noise which is within the preset range from the latest collected sound that satisfies the preset condition.

7. The apparatus for detecting sound as claimed in claim 6, wherein said direction control module removes the background noise which is not within the preset range from the latest collected sound that satisfies the preset condition by adjusting a weight vector of the direction control of a spatial filter.

8. The apparatus for detecting sound as claimed in claim 1, further comprising a sound classifying unit that includes an alert message sound database, said sound classifying unit receiving the detected sound sent by said background noise removing unit, identifying from said alert message sound database an alert message corresponding to the detected sound, and transmitting the alert message to said alerting unit.

9. The apparatus for detecting sound as claimed in claim 8, wherein said sound classifying unit first calculates a Mel-Frequency Cepstral Coefficient of the detected sound, and calculates the Mahalanobis distances between the detected sound and various sound samples in said alert message sound database according to the Mel-Frequency Cepstral Coefficient, an alert message corresponding to a sound sample with the smallest Mahalanobis distance thus calculated serving as the alert message corresponding to the detected sound.

10. The apparatus for detecting sound as claimed in claim 1, wherein said direction estimating unit uses a Direction of Arrival technique to estimate the occurrence direction of the latest collected sound that satisfies the preset condition.

11. The apparatus for detecting sound as claimed in claim 10, wherein the Direction of Arrival technique is the Multiple Signal Classification method.

12. A method for detecting sound, comprising the following steps:
 (a) collecting sounds around a user, wherein the sounds include a background noise;
 (b) calculating the feature values of the background noise within a preset time interval, and determining if a latest collected sound satisfies a preset condition;
 (c) when the preset condition is satisfied, estimating the occurrence direction of the latest collected sound, and determining if the occurrence direction is within a preset range behind the user;
 (d) when the occurrence direction is within the preset range, removing the background noise in the latest collected sound so as to obtain a detected sound; and
 (e) informing the user of the detected sound via an alert message.

13. The method for detecting sound as claimed in claim 12, wherein step (b) includes calculating an average value and a standard deviation of the energy spectrum of the background noise within the preset time interval as the feature values, and the preset condition be that the energy of the latest collected sound is larger than the sum of the average value and the standard deviation.

14. The method for detecting sound as claimed in claim 13, wherein step (d) includes removing the background noise which is not within the preset range from the latest collected sound that satisfies the preset condition, followed by removing the background noise which is within the preset range from the latest collected sound that satisfies the preset condition.

15. The method for detecting sound as claimed in claim 14, wherein, in step (d), the removal of the background noise which is not within the preset range from the latest collected sound that satisfies the preset condition is conducted by adjusting a weight vector of the direction control of a spatial filter.

16. The method for detecting sound as claimed in claim 14, wherein step (d) includes calculating the energy spectrum in the preset range from the latest collected sound that satisfies the preset condition, followed by subtracting the average value of the energy spectrum of the background noise from the calculated energy spectrum so as to remove the background noise which is within the preset range from the latest collected sound that satisfies the preset condition, thereby obtaining the detected sound.

17. The method for detecting sound as claimed in claim 12, wherein step (d) includes removing the background noise which is not within the preset range from the latest collected sound that satisfies the preset condition, followed by removing the background noise which is within the preset range from the latest collected sound that satisfies the preset condition.

18. The method for detecting sound as claimed in claim 17, wherein, in step (d), the removal of the background noise which is not within the preset range from the latest collected sound that satisfies the preset condition is conducted by adjusting a weight vector of the direction control of a spatial filter.

19. The method for detecting sound as claimed in claim 12, further comprising, between steps (d) and (e), a step (f) of performing sound classification upon obtaining the detected sound in step (d) to identify an alert message corresponding to the detected sound, and transmitting the alert message to step (e).

20. The method for detecting sound as claimed in claim 19, wherein step (f) includes: calculating a Mel-Frequency Cepstral Coefficient of the detected sound, and calculating the Mahalanobis distances between the detected sound and various sound samples according to the Mel-Frequency Cepstral Coefficient, an alert message corresponding to a sound sample with the smallest Mahalanobis distance thus calculated serving as the alert message corresponding to the detected sound.

21. The method for detecting sound as claimed in claim 12, wherein a Direction of Arrival technique is used in step (c) to estimate the occurrence direction of the latest collected sound that satisfies the preset condition.

22. The method for detecting sound as claimed in claim 21, wherein the Direction of Arrival technique is the Multiple Signal Classification method.

* * * * *